(12) United States Patent  (10) Patent No.: US 8,033,238 B2
Nam et al.  (45) Date of Patent: Oct. 11, 2011

(54) INDICATOR DISPLAY DEVICE

(75) Inventors: Uk Nam, Suwon-si (KR); Hong-ki Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 220 days.

(21) Appl. No.: 12/471,602

(22) Filed: May 26, 2009

(65) Prior Publication Data

US 2010/0024715 A1 Feb. 4, 2010

(30) Foreign Application Priority Data

Aug. 1, 2008 (KR) ........................ 10-2008-0075584

(51) Int. Cl.
- *G01D 13/26* (2006.01)
- *G01D 3/08* (2006.01)
- *G03B 17/18* (2006.01)
- *G03B 17/36* (2006.01)

(52) U.S. Cl. ..................................... 116/284; 340/691.7
(58) Field of Classification Search .................. 116/284; 318/696; 340/691.7; 250/231.13

See application file for complete search history.

(56) References Cited

U.S. PATENT DOCUMENTS

| | | | | |
|---|---|---|---|---|
| 4,500,780 A | * | 2/1985 | Buan et al. | 250/231.13 |
| 4,622,505 A | * | 11/1986 | Okabayashi et al. | 318/696 |
| 5,171,982 A | * | 12/1992 | Kronenberg | 250/231.13 |
| 6,014,075 A | * | 1/2000 | Fujimori et al. | 340/461 |
| 6,731,571 B2 | * | 5/2004 | Yiu | 368/79 |
| 6,853,162 B2 | * | 2/2005 | Betts et al. | 318/696 |
| 6,940,269 B2 | * | 9/2005 | Komura | 324/146 |
| 7,034,496 B2 | * | 4/2006 | Oishi | 318/696 |
| 7,554,245 B2 | * | 6/2009 | Hasegawa | 310/334 |
| 2009/0086580 A1 | * | 4/2009 | Aoki | 368/10 |
| 2009/0277373 A1 | * | 11/2009 | Sasaki et al. | 116/62.1 |

FOREIGN PATENT DOCUMENTS

| | | |
|---|---|---|
| DE | 198 37 824 A1 | 3/2000 |
| EP | 1 939 700 A2 | 7/2008 |
| GB | 1 225 904 A | 3/1971 |
| GB | 1225904 A * | 3/1971 |
| JP | 55131297 A * | 10/1980 |
| JP | 06094858 A * | 4/1994 |
| JP | 11-47371 A | 2/1999 |
| JP | 2001-99718 A | 7/2000 |
| JP | 2001-75601 A | 3/2001 |
| JP | 2001327149 A * | 11/2001 |
| WO | WO 98/01339 A2 | 1/1998 |

\* cited by examiner

*Primary Examiner* — Richard A Smith
(74) *Attorney, Agent, or Firm* — Drinker Biddle & Reath LLP

(57) ABSTRACT

Provided is an indicator display device displaying information by using an indicator, and more particularly, provided is an indicator display device having a simplified configuration and including a small module. The indicator display device includes a stepping motor; an indicator which is connected to the stepping motor and rotates by a driving force provided by the stepping motor; and an indicator position detector which detects a relative position of the indicator with regard to the stepping motor.

18 Claims, 6 Drawing Sheets

INDICATOR DISPLAY DEVICE

CROSS-REFERENCE TO RELATED PATENT APPLICATION

This application claims the benefit of Korean Patent Application No. 10-2008-0075584, filed on Aug. 1, 2008, in the Korean Intellectual Property Office, the disclosure of which is incorporated herein in its entirety by reference.

BACKGROUND OF THE INVENTION

1. Field of the Invention

The present invention relates to an indicator display device displaying information by using an indicator, and more particularly, to an indicator display device having a simplified configuration and a small module size.

2. Description of the Related Art

Conventional indicator display devices which display information by using an indicator, are broadly employed in various measuring instruments such as analog watches, clocks, thermometers, barometers, and speedometers. In general, in a conventional indicator display device a magnetic force generated from a coil in response to receiving an electric signal, drives a gear so as to activate an indicator that is connected to the gear, thereby displaying an appropriate numerical value.

Many attempts have been recently made to adopt such an indicator display device in various portable electronic devices such as digital cameras, in order to improve their external appearance or their visual effect. However, conventional indicator display devices are formed of various components such as a plurality of coils disposed around a module, a plurality of gears driven by the coils, and a battery. As such, due to a large number of components, complicated operation thereof, and a quite large module size, it is becoming more difficult to adopt conventional indicator display devices in electronic devices which are getting progressively slimmer and smaller.

SUMMARY OF THE INVENTION

The present invention provides an indicator display device having a slim and small size by using a stepping motor which reduces the number of components and simplifies a configuration of the indicator display device.

According to an aspect of the present invention, there is provided an indicator display device including a stepping motor; an indicator which is connected to the stepping motor and rotates by a driving force provided by the stepping motor; and an indicator position detector which detects a relative position of the indicator with regard to the stepping motor.

The indicator display device may further include a gear which is combined with the stepping motor and outputs the driving force generated by the stepping motor; and a gear blade which is formed at a side of the gear so as to engage with the gear, and rotates together with the gear when the gear rotates, and the indicator may be combined with the gear blade and rotate together with the gear blade.

The gear blade may include a protrusion having a radius which is larger than a radius of a remaining portion of the gear blade, and the indicator position detector may detect a position of the protrusion.

The protrusion may extend to at least a position which is detectable by the indicator position detector.

The protrusion may extend to at least a position immediately above the indicator position detector.

When the indicator display device is turned on, the stepping motor may be rotated until the position of the protrusion starts to be detected by the indicator position detector.

When the indicator display device is turned on, the position of the indicator may be initialized by the indicator position detector.

The initialized position may be a position at which the protrusion starts to be detected by the indicator position detector when the gear blade rotates in a predetermined direction.

The indicator position detector may include a light emission unit and a light reception unit, and detect the position of the indicator according to whether light emitted from the light emission unit is reflected to return to the light reception unit.

The light emitted from the light emission unit may be reflected by the protrusion of the gear blade to return to the light reception unit.

The indicator position detector may be a photo sensor.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, the present invention will be described in detail by explaining embodiments of the invention with reference to the attached drawings.

Figure 1:
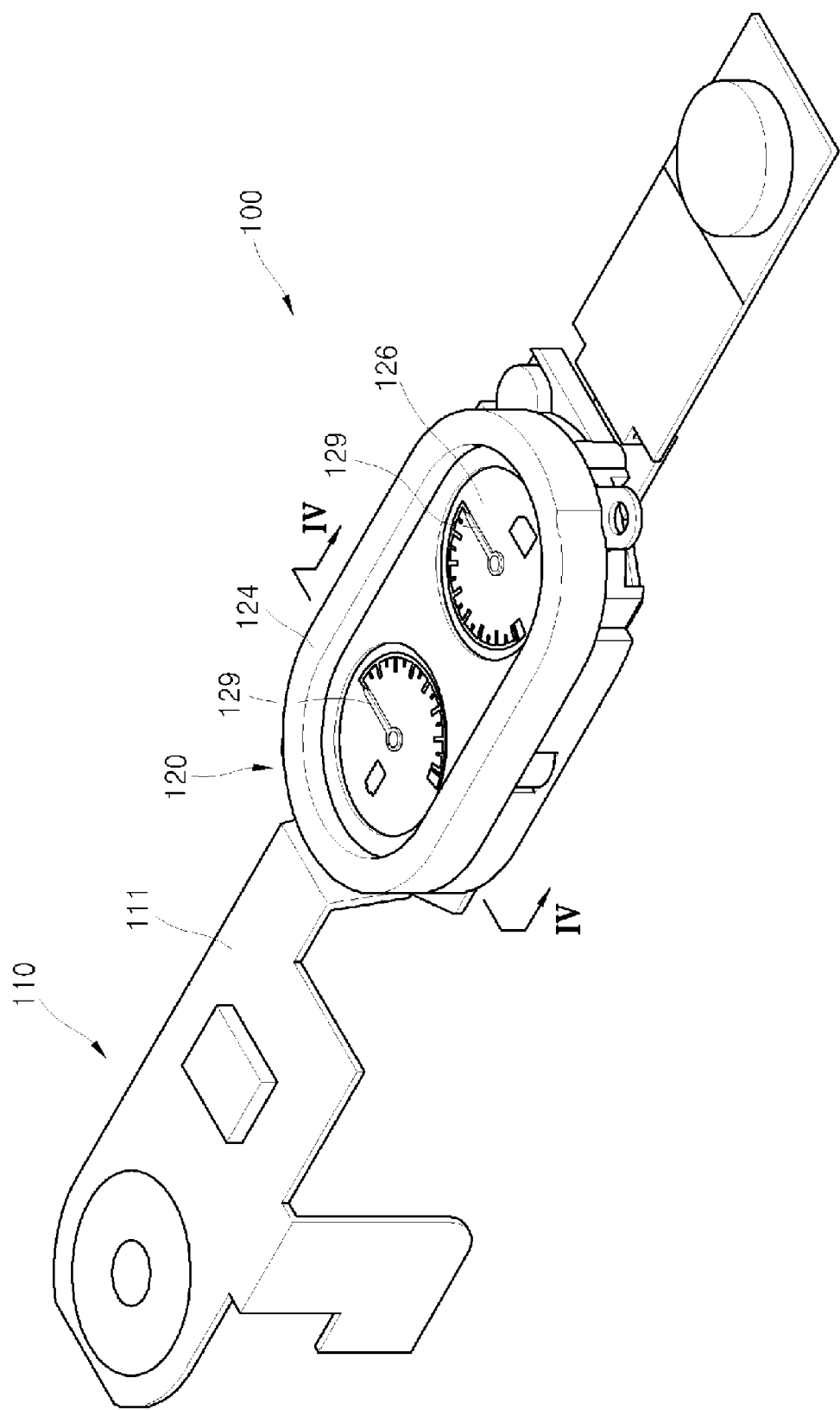
FIG. 1 is a combined perspective view of an indicator display device according to an embodiment of the present invention.

FIG. 1 is a combined perspective view of an indicator display device 100 according to an embodiment of the present invention.

Referring to FIG. 1, the indicator display device 100 includes a printed circuit board (PCB) assembly 110 and an indicator assembly 120.

Figure 2:
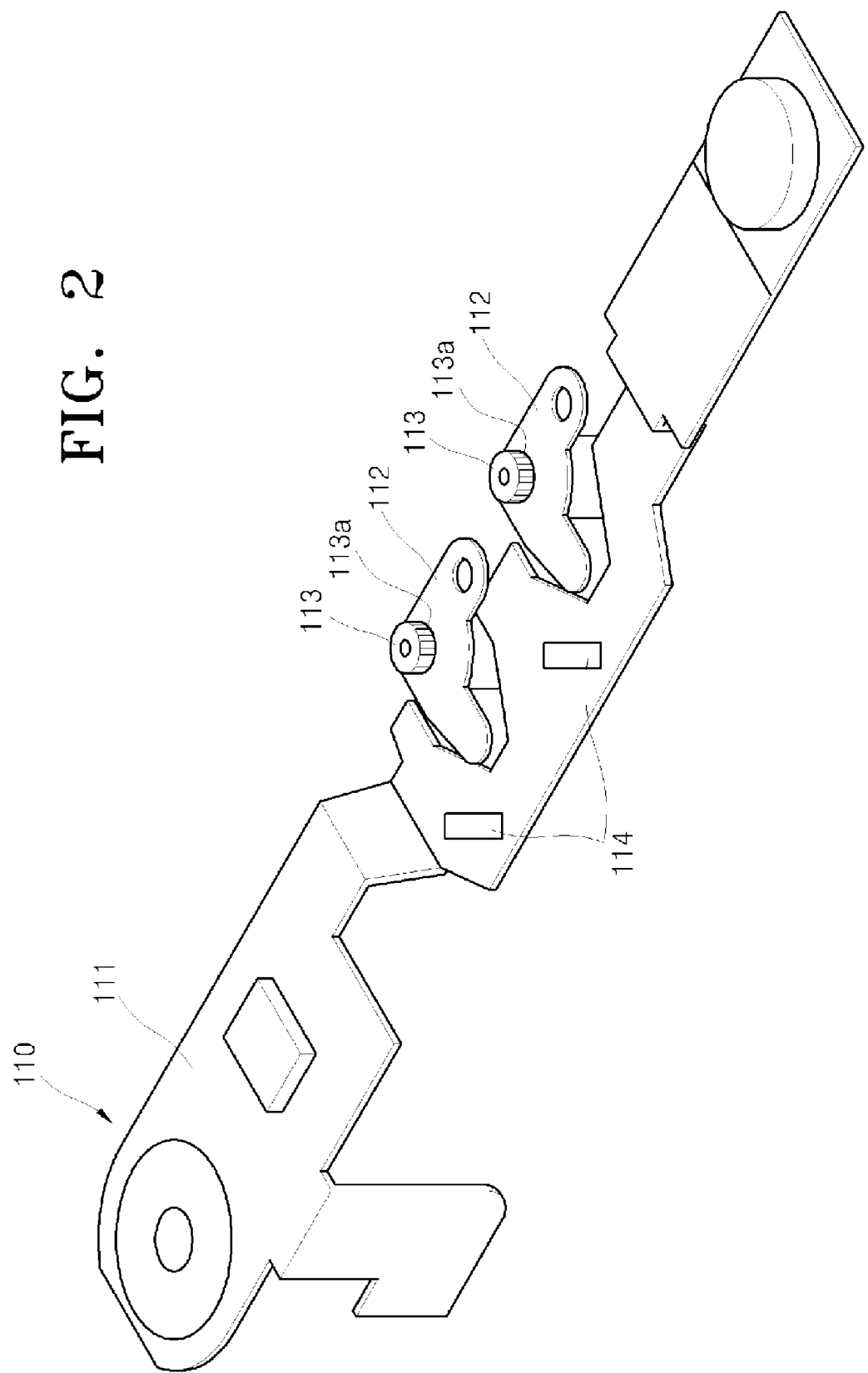
FIG. 2 is a combined perspective view of a printed circuit board (PCB) assembly of the indicator display device illustrated in FIG. 1.

FIG. 2 is a combined perspective view of the PCB assembly 110 of the indicator display device 100 illustrated in FIG. 1.

Referring to FIG. 2, the PCB assembly 110 includes a PCB 111, a stepping motor 112, a gear 113, and an indicator position detector 114. The PCB assembly 110 is connected to the indicator assembly 120 illustrated in FIG. 1, by using the stepping motor 112 and the gear 113 that is combined with the stepping motor 112. Also, the PCB assembly 110 is connected to a main PCB of an electronic device, such as a digital camera, which includes the indicator display device 100, so as to generally control the indicator display device 100.

The PCB 111 is a substrate on which various elements and circuits required to drive the indicator display device 100 are disposed.

The stepping motor 112 is formed on the PCB 111. In this case, the PCB 111 and the stepping motor 112 may be combined with each other by using solder. Here, the indicator display device 100 includes the stepping motor 112 as an indicator moving means for moving an indicator (refer to reference numeral 129 of FIG. 3).

In more detail, many attempts have been recently made to adopt an indicator display device in various electronic devices such as digital cameras, in order to improve their external appearance or their visual effect. However, due to a large number of components, complicated operation thereof, and a quite large module size, it is difficult for conventional indicator display devices to be adopted in electronic devices which are getting progressively slimmer and smaller.

In order to solve the above problem, the indicator display device 100 according to the current embodiment of the present invention may have a slim and small size by using the stepping motor 112 as the indicator moving means. This reduces the number of components and simplifies a configuration of the indicator display device 100.

The stepping motor 112 may control a predetermined angle of rotation in response to a pulse signal. In more detail, the stepping motor 112 may rotate by a predetermined angle in correspondence with the number of input pulses, and can also be referred to as a pulse motor or a step motor. Since the number of input pulses is directly proportional to a rotation angle of the stepping motor 112, the stepping motor 112 may accurately control the rotation angle, and the rotation angle may be easily controlled by a digital signal.

A total rotation angle of the stepping motor 112 is proportional to a total number of input pulses, and a rotation speed of the stepping motor 112 is proportional to the number of input pulses per second (a pulse rate). In this case, an error of a rotation angle in a previous step does not affect a rotation angle in a current step. Since the total rotation angle of the stepping motor 112 is determined according to the number of input pulses, feedback for detecting a rotation angle, which is required by a direct current (DC) servo motor, is not required in this case, and thus a control system for the stepping motor 112 has a simple configuration, thereby reducing costs. Also, repair work such as brush exchange, which is required for a DC servo motor, is not required and thus maintenance costs can be reduced. Furthermore, due to the stepping motor 112 having a small size, the size of the indicator display device 100 may be reduced.

Here, in FIG. 2, two stepping motors 112 are formed in a row. However, the present invention is not limited thereto. The number of the stepping motors 112 may correspond to the number of indicators required by an electronic device.

The gear 113 is disposed on the stepping motor 112. In more detail, a rotation shaft (not shown) is protrusively formed on the stepping motor 112 so as to output a driving force generated by the stepping motor 112, out of the stepping motor 112. The gear 113 is press-fitted to the rotation shaft so as to transfer the driving force of the stepping motor 112 to the indicator assembly 120. In other words, as a screw thread 113a that is formed on an outer surface of the gear 113 rotates in engagement with a screw thread (refer to reference numeral 123b of FIG. 3) that is formed on an outer surface of a gear blade (refer to reference numeral 123 of FIG. 3), the driving force of the stepping motor 112 is transferred to the indicator assembly 120 so as to rotate the indicator (refer to reference numeral 129 of FIG. 3).

Meanwhile, the indicator position detector 114 may be formed at one side of the stepping motor 112, on the PCB 111. The indicator position detector 114 initializes a position of the indicator (refer to reference numeral 129 of FIG. 3) by detecting a position of a protrusion (refer to reference numeral 123c of FIG. 3) of the gear blade (refer to reference numeral 123 of FIG. 3). Operations of the indicator position detector 114 and the gear blade (refer to reference numeral 123 of FIG. 3) will be described in detail later. In this case, the indicator position detector 114 may be a photo sensor including a light emission unit and a light reception unit. In this case, the light emission unit of the photo sensor may periodically emit light and the light reception unit may receive the light emitted by the light emission unit if the light is reflected by another object to return to the light reception unit. As such, a position of an object may be detected. Various technologies regarding the photo sensor are well-known and thus detailed descriptions thereof will be omitted here.

Figure 3:
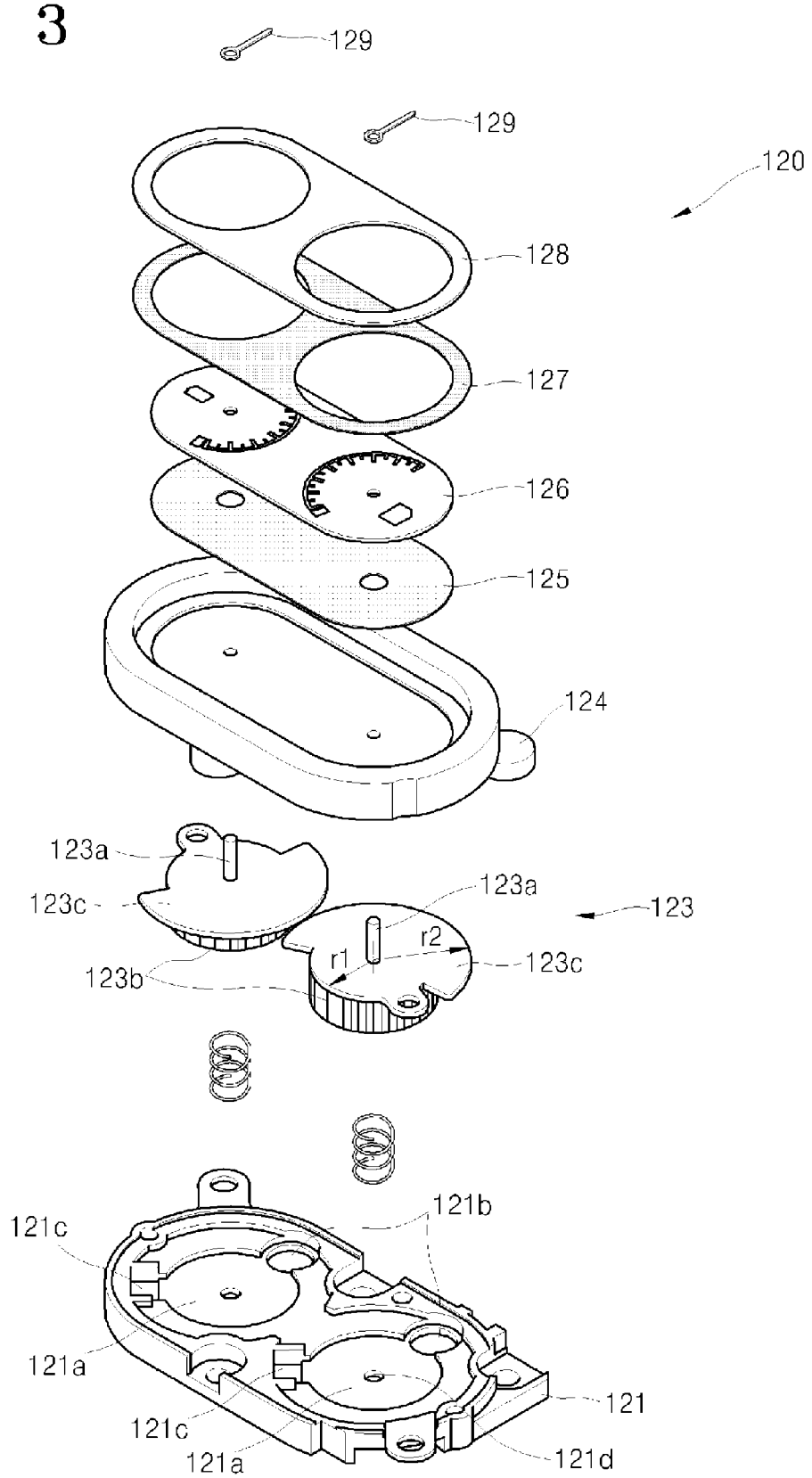
FIG. 3 is an exploded perspective view of an indicator assembly of the indicator display device illustrated in FIG. 1.

FIG. 3 is an exploded perspective view of the indicator assembly 120 of the indicator display device 100 illustrated in FIG. 1. FIG. 3 will be described in conjunction with FIG. 2.

Referring to FIG. 3, the indicator assembly 120 includes a holder 121, a gear blade 123, a cover 124, a first adhesive member 125, a first plate 126, a second adhesive member 127, a second plate 128, and an indicator 129.

The holder 121 forms a base portion of the indicator assembly 120 and the above components are sequentially disposed on the holder 121.

In more detail, a blade loader 121a on which the gear blade 123 is to be disposed, is recessively formed in the holder 121. A hole 121d is formed at or near the center of the blade loader 121a. A rotation shaft (not shown) that extends from a lower surface of the gear blade 123, fits into the hole 121d so as to function as a rotation axis of the gear blade 123. Also, the blade loader 121a has a diameter which is almost the same as or slightly larger than a diameter of the gear blade 123 so that the gear blade 123 does not break away from the holder 121.

Meanwhile, a gear hole 121b is formed at one side of the blade loader 121a. The above-described gear 113 of the indicator display device 100 is inserted from the bottom, through the gear hole 121b. The gear 113 that protrudes from the holder 121 through the gear hole 121b, is formed to engage with the gear blade 123 so as to transfer a driving force of the stepping motor 112 of the indicator display device 100 to the indicator 129.

Meanwhile, a sensor hole 121c is formed at another side of the blade loader 121a. The sensor hole 121c is formed immediately above the above-described indicator position detector 114. Through the sensor hole 121c, light emitted from a light emission unit of the indicator position detector 114 in a direction toward the gear blade 123, that is, an upward direction in FIG. 3, may be reflected on the gear blade 123 to return to a light reception unit of the indicator position detector 114. Thus, the indicator position detector 114 may detect a position of the gear blade 123.

The gear blade 123 is disposed on the blade loader 121a of the holder 121. The gear blade 123 has an almost cylindrical shape and a screw thread 123b is formed on an outer surface of the gear blade 123. As described above with reference to FIG. 2, the screw thread 123b of the gear blade 123 is formed to engage with the screw thread 113a of the gear 113.

Meanwhile, a rotation shaft 123a is protrusively formed on the gear blade 123. The rotation shaft 123a penetrates through the cover 124, the first adhesive member 125, the first plate 126, the second adhesive member 127, and the second plate 128 so as to be combined with the indicator 129. In other words, if the stepping motor 112 rotates, the gear 113 that is combined with the stepping motor 112 rotates, the gear blade 123 that is engaged with the gear 113 rotates, and then the indicator 129 that is combined with the gear blade 123 rotates together with the gear blade 123.

Meanwhile, a protrusion 123c is formed on an upper portion of the gear blade 123 having the cylindrical shape. A radius r2 of the protrusion 123c is larger than a radius r1 of a remaining portion of the gear blade 123. In more detail, the protrusion 123c extends to a position above the sensor hole 121c so as to cover the sensor hole 121c. Thus, while the gear blade 123 is rotating, if the protrusion 123c is positioned above the sensor hole 121c, the light emitted from the light emission unit of the indicator position detector 114 is reflected on a lower surface of the protrusion 123c so as to be received by the light reception unit of the indicator position detector 114. Accordingly, the indicator position detector 114 may detect that the protrusion 123c is positioned above the sensor hole 121c. On the other hand, if the protrusion 123c is not positioned above the sensor hole 121c, the light emitted from the light emission unit of the indicator position detector 114 is not reflected and thus is not received by the light reception unit of the indicator position detector 114. Accordingly, the indicator position detector 114 may detect that the protrusion 123c is not positioned above the sensor hole 121c.

The cover 124 is disposed on and combined with the holder 121. The cover 124 protects components such as the gear blade 123. The first and second plates 126 and 128 on which at least one of various scales, text, numbers, and symbols which are necessary for a user to read the indicator display device 100 are marked, are sequentially disposed on the cover 124. The cover 124 and the first plate 126 may be combined with each other by using the first adhesive member 125 that is disposed therebetween and the first and second plates 126 and 128 may be combined with each other by using the second adhesive member 127 that is disposed therebetween. Meanwhile, a hole may be formed at a center of each of the cover 124, the first adhesive member 125, the first plate 126, the second adhesive member 127, and the second plate 128 such that the rotation shaft 123a of the gear blade 123 penetrates therethrough.

The indicator 129 fits to the rotation shaft 123a of the gear blade 123, which protrudes upward by penetrating through the cover 124, the first adhesive member 125, the first plate 126, the second adhesive member 127, and the second plate 128.

Although two holders 121, two gear blades 123, and two indicators 129 are illustrated in FIG. 3, the present invention is not limited thereto. The number of each type of components may vary.

Figure 4:
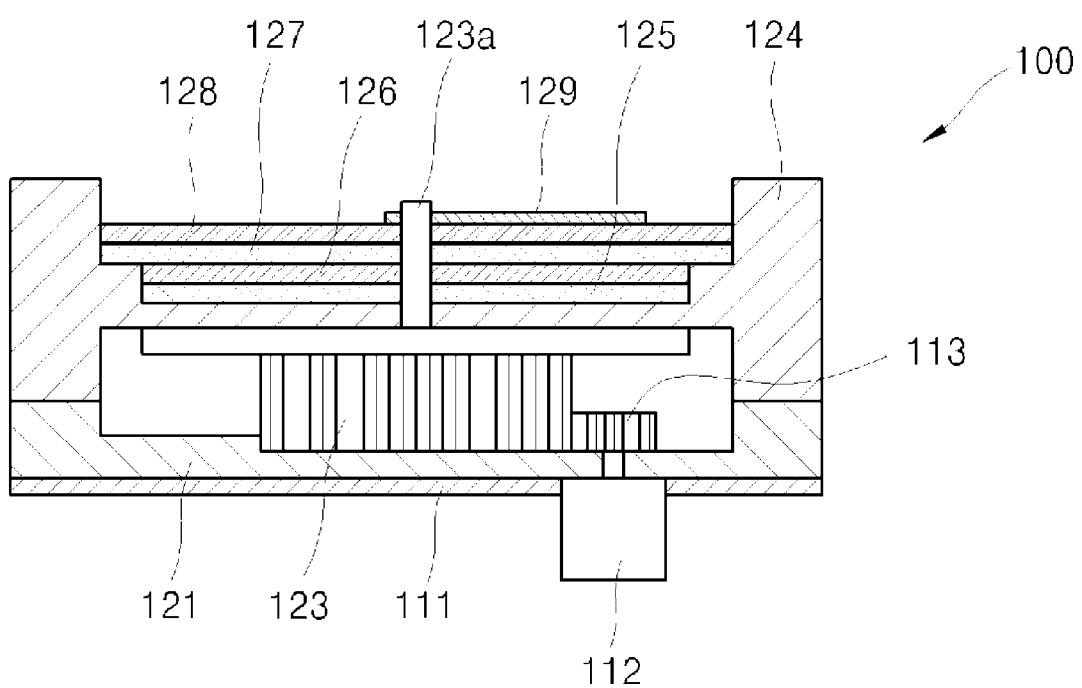
FIG. 4 is a cross-sectional view of the indicator display device illustrated in FIG. 1 taken along a line IV-IV.

FIG. 4 is a cross-sectional view of the indicator display device 100 illustrated in FIG. 1 taken along a line IV-IV.

An initialization operation of the indicator display device 100 illustrated in FIG. 1 will now be described.

Figure 5:
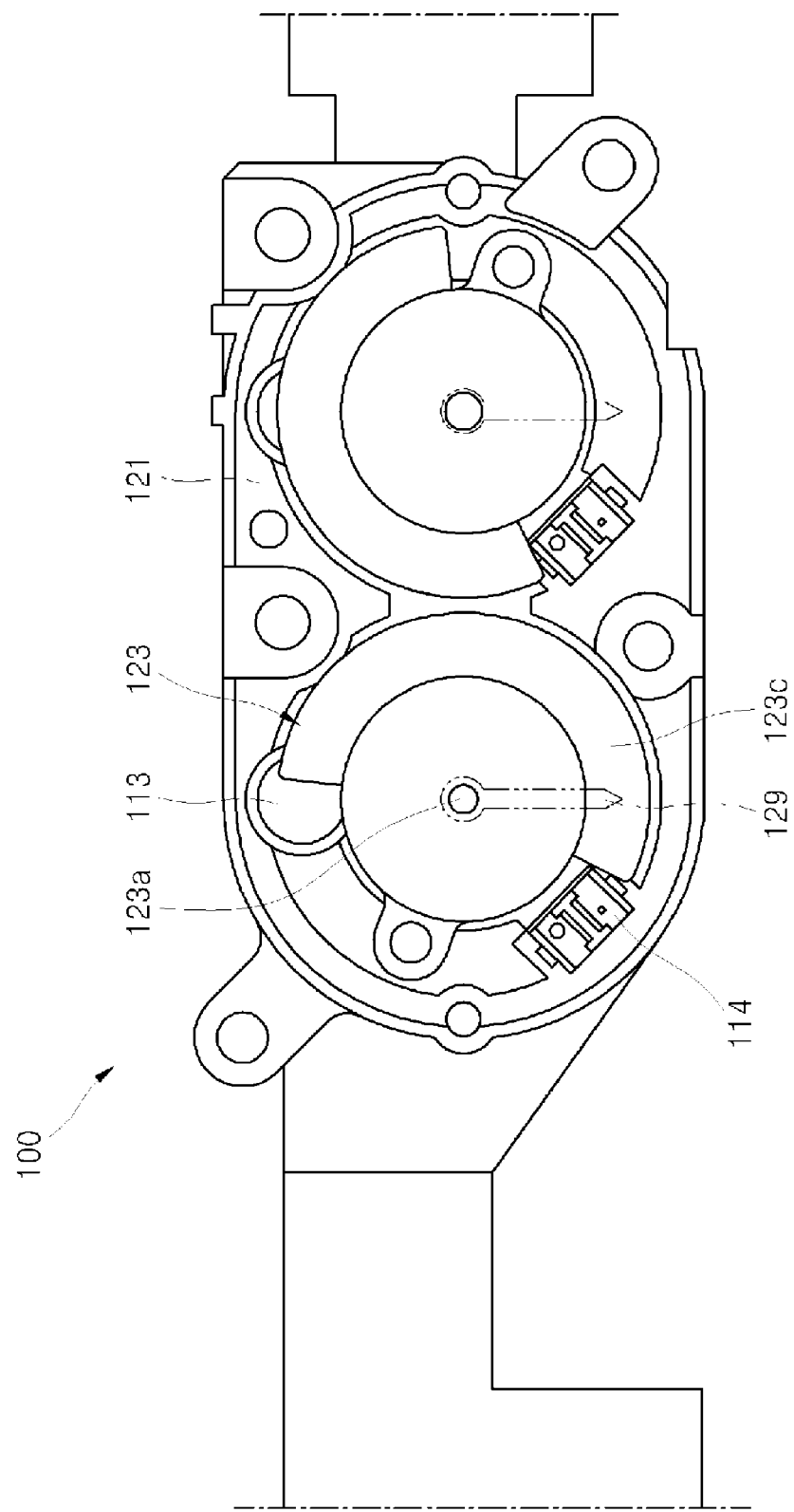
FIG. 5 is a plan view of the indicator display device illustrated in FIG. 1, according to an embodiment of the present invention.

FIG. 5 is a plan view of the indicator display device 100 illustrated in FIG. 1, according to an embodiment of the present invention. FIG. 5 will be described with reference to the left components of the two gears 113, indicator position detectors 114, and gear blades 123.

In FIG. 5, a position of a gear blade 123 is initialized. Here, an initialization position of the gear blade 123 is a state in which a protrusion 123c of the gear blade 123 does not cover an indicator position detector 114 and an edge of the protrusion 123c of the gear blade 123 is positioned right above an edge of the indicator position detector 114. In other words, the initialization position of the indicator display device 100 is a position at which the protrusion 123c starts to be detected by the indicator position detector 114 when the gear blade 123 is rotated in a predetermined direction, for example, a clockwise direction.

In more detail, when the indicator display device 100 is turned on, a stepping motor (refer to reference numeral 112 of FIG. 2) and a gear 113 that is combined with the stepping motor start to rotate in a counterclockwise direction of FIG. 5. Then, the gear blade 123 that is engaged with the gear 113 starts to rotate in a clockwise direction of FIG. 5. While the gear blade 123 is rotating, a moment when the protrusion 123c starts to be detected by the indicator position detector 114, in other words, when the protrusion 123c of the gear blade 123 starts to be positioned above the indicator position detector 114, corresponds to the initialization position of the gear blade 123.

As such, due to the presence of the indicator position detector 114 using a photo sensor, even if the indicator display device 100 is abnormally turned off and an indicator 129 becomes positioned at an arbitrary position, the position of the indicator 129 may be automatically initialized when the indicator display device 100 is turned on. Also, although components of the indicator display device 100 are formed with some differences in light of an assembling tolerance, the indicator 129 may still be accurately disposed at the initialization position when the indicator display device 100 operates. Thus, accuracy of a product may be improved, the product may be easily produced, and user's convenience may be improved.

Figure 6:
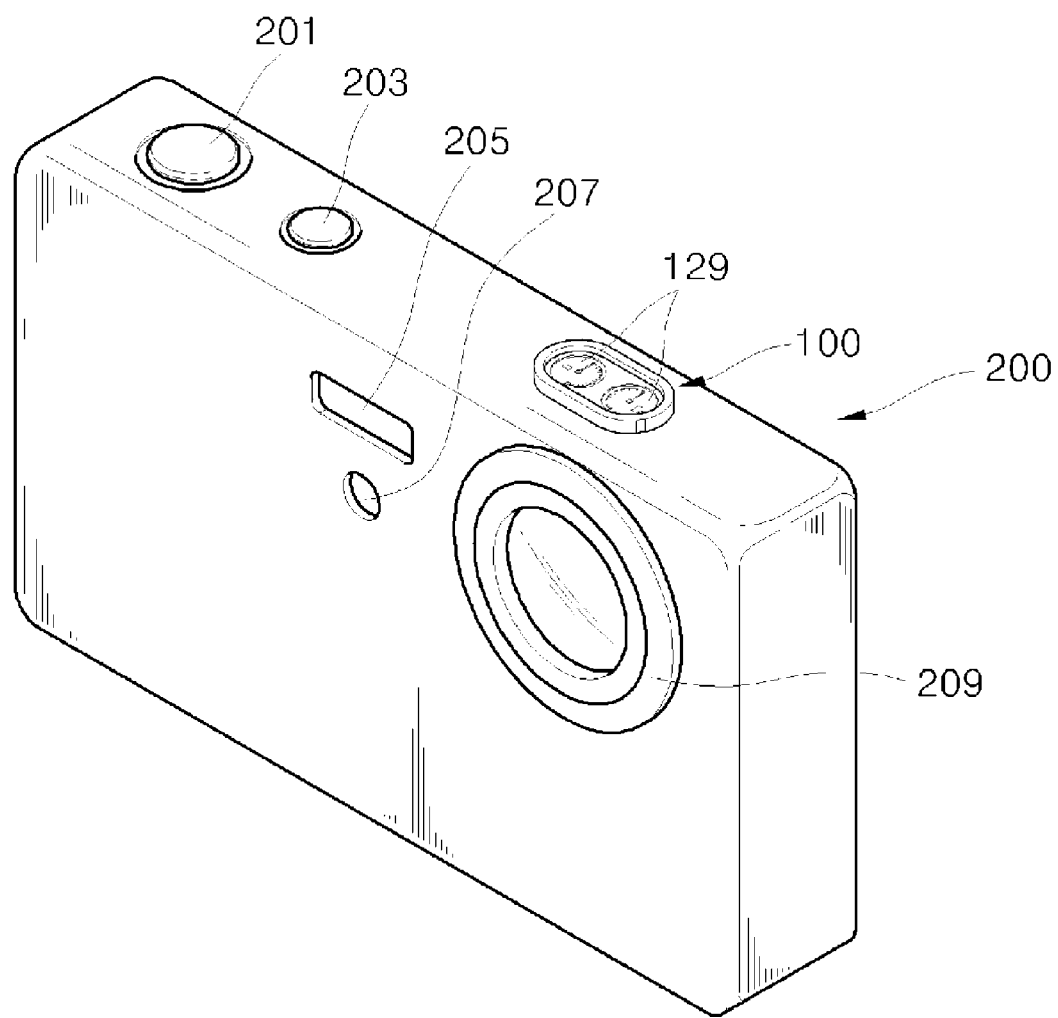
FIG. 6 is a perspective view of a digital image processing apparatus on which the indicator display device illustrated in FIG. 1 is mounted, according to an embodiment of the present invention.

FIG. 6 is a perspective view of a digital image processing apparatus 200 on which the indicator display device 100 illustrated in FIG. 1 is mounted, according to an embodiment of the present invention.

Referring to FIG. 6, a shutter-release button 201 opens and closes a shutter(not shown) so as to expose a charge-coupled device (CCD) or a film to light and to record an image on the CCD. The shutter-release button 201 generates first and second image capturing signals based on input of a user. If a first shutter-release signal is input in a half depressed state of the shutter-release button 201, the digital image processing apparatus 200 focuses on a subject and controls aperture settings etc. In this case, if the digital image processing apparatus 200 is in focus, a green light is turned on via a display unit. After the digital image processing apparatus 200 has performed focusing and the aperture settings etc. are controlled according to the first shutter-release signal, a second shutter-release signal is input by fully depressing the shutter-release button so as to capture an image.

A power button 203 provides power so as to operate the digital image processing apparatus 200. A flash 205 simultaneously emits light when dark or required by the user and flash modes include an auto-flash mode, a flash-on mode, a flash-off mode, a red-eye reduction mode, and a slow synchro mode. A focusing light 207 provides light to a subject so that the digital image processing apparatus 200 rapidly and accurately auto-focuses on the subject in a dark place or at night. A lens unit 209 focuses light from the subject and processes an image.

The indicator display device 100 may be disposed in the digital image processing apparatus 200 so as to display various types of information such as a remaining battery capacity or a remaining memory capacity of the digital image processing apparatus 200 in an analog method. Due to the indicator display device 100 having a slim and small size, an external appearance and a visual effect of the digital image processing apparatus 200 may be improved.

As described above, according to the present invention, an indicator display device may have a slim and small size by reducing the number of its components and simplifying its configuration.

While the present invention has been particularly shown and described with reference to preferred embodiments thereof, it will be understood by one skilled in the art that various changes in form and details may be made therein without departing from the spirit and scope of the invention as defined by the appended claims. The preferred embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An indicator display device, comprising:
   a stepping motor;
   an indicator which is connected to the stepping motor and rotates by a driving force provided by the stepping motor;
   an indicator position detector which detects a relative position of the indicator with regard to the stepping motor;
   a gear which is combined with the stepping motor and outputs the driving force generated by the stepping motor; and
   a gear blade which is formed at a side of the gear so as to engage with the gear, and rotates together with the gear when the gear rotates;
   wherein:
   the indicator is combined with the gear blade and rotates together with the gear blade;
   the gear blade comprises a protrusion having a radius which is larger than a radius of a remaining portion of the gear blade;
   the indicator position detector detects a position of the protrusion; and
   when the indicator display device is turned on, the stepping motor is rotated until the position of the protrusion starts to be detected by the indicator position detector.

2. The indicator display device of claim 1, wherein the protrusion extends to at least a position which is detectable by the indicator position detector.

3. The indicator display device of claim 2, wherein the protrusion extends to at least a position immediately above the indicator position detector.

4. The indicator display device of claim 1, wherein the indicator position detector is a photo sensor.

5. The indicator display device of claim 1, wherein the indicator position detector is a photo sensor.

6. A camera comprising:
   the indicator display device of claim 1.

7. An indicator display device, comprising:
   a stepping motor;
   an indicator which is connected to the stepping motor and rotates by a driving force provided by the stepping motor;
   an indicator position detector which detects a relative position of the indicator with regard to the stepping motor;
   a gear which is combined with the stepping motor and outputs the driving force generated by the stepping motor; and
   a gear blade which is formed at a side of the gear so as to engage with the gear, and rotates together with the gear when the gear rotates;
   wherein:
   the indicator is combined with the gear blade and rotates together with the gear blade;
   the gear blade comprises a protrusion having a radius which is larger than a radius of a remaining portion of the gear blade;
   the indicator position detector detects a position of the protrusion; and
   when the indicator display device is turned on, the position of the indicator is initialized by the indicator position detector.

8. The indicator display device of claim 7, wherein the initialized position is a position at which the protrusion starts to be detected by the indicator position detector when the gear blade rotates in a predetermined direction.

9. The indicator display device of claim 7, wherein the protrusion extends to at least a position which is detectable by the indicator position detector.

10. The indicator display device of claim 9, wherein the protrusion extends to at least a position immediately above the indicator position detector.

11. The indicator display device of claim 7, wherein the protrusion extends to at least a position which is detectable by the indicator position detector.

12. The indicator display device of claim 11, wherein the protrusion extends to at least a position immediately above the indicator position detector.

13. A camera comprising:
    the indicator display device of claim 7.

14. An indicator display device, comprising:
    a stepping motor;
    an indicator which is connected to the stepping motor and rotates by a driving force provided by the stepping motor;
    an indicator position detector which detects a relative position of the indicator with regard to the stepping motor;
    a gear which is combined with the stepping motor and outputs the driving force generated by the stepping motor; and
    a gear blade which is formed at a side of the gear so as to engage with the gear, and rotates together with the gear when the gear rotates;
    wherein:
    the indicator is combined with the gear blade and rotates together with the gear blade;
    the gear blade comprises a protrusion having a radius which is larger than a radius of a remaining portion of the gear blade;
    the indicator position detector detects a position of the protrusion; and
    the indicator position detector comprises a light emission unit and a light reception unit, and detects the position of the indicator according to whether light emitted from the light emission unit is reflected to return to the light reception unit.

15. The indicator display device of claim 14, wherein the light emitted from the light emission unit is reflected by the protrusion of the gear blade to return to the light reception unit.

16. The indicator display device of claim 14, wherein the protrusion extends to at least a position which is detectable by the indicator position detector.

17. The indicator display device of claim 16, wherein the protrusion extends to at least a position immediately above the indicator position detector.

18. A camera comprising:
    the indicator display device of claim 14.

* * * * *